United States Patent [19]

Keefer

[11] Patent Number: 4,816,121
[45] Date of Patent: * Mar. 28, 1989

[54] GAS PHASE CHEMICAL REACTOR

[76] Inventor: Bowie G. Keefer, 4324 W. 11th Ave., Vancouver, B.C., Canada, V6R 2M1

[*] Notice: The portion of the term of this patent subsequent to Oct. 27, 2004 has been disclaimed.

[21] Appl. No.: 929,522

[22] Filed: Nov. 12, 1986

Related U.S. Application Data

[63] Continuation-in-part of Ser. No. 866,395, May 23, 1986, Pat. No. 4,702,903, which is a continuation-in-part of Ser. No. 538,320, Oct. 3, 1983, abandoned.

[51] Int. Cl.$^4$ .......................... C01C 1/04; B01D 53/04
[52] U.S. Cl. .......................... 204/156; 55/28; 55/68; 55/160; 55/208; 60/649; 60/673; 252/373; 423/359; 423/648.1; 423/652; 518/722; 568/840
[58] Field of Search .......................... 204/156, 28, 68; 55/160, 208; 60/649, 673; 252/373; 423/359, 648.1; 518/722; 568/840

[56] References Cited

U.S. PATENT DOCUMENTS 4,702,903 10/1987 Keefer .......................... 423/359

Primary Examiner—John Doll
Assistant Examiner—Wayne A. Langel

[57] ABSTRACT

Gas or vapor phase chemical reactions are conducted inside an open loop Stirling cycle apparatus which may operate as a heat engine or as a heat pump. Adsorbent surfaces are associated with the thermal regenerators of the Stirling cycle apparatus, so that pressure swing adsorption separation of reactant and product gas species may be achieved in response to cyclic variations of flow and pressure within the apparatus. Flow control means are provided to introduce the feed gas into the working space of the apparatus and to remove separated product fractions. The feed gas is chemically reactive in a reaction zone of the working space, with reactant and product species separated by the apparatus to remove desired product(s) from the reaction zone while retaining reactant(s) in the reaction zone, so that conversion and selectivity objectives can be achieved. Engine embodiments of the invention may then convert heat of an exothermic reaction to mechanical power, while heat pump embodiments may supply heat to an endothermic reaction.

30 Claims, 3 Drawing Sheets

GAS PHASE CHEMICAL REACTOR

This application is a continuation-in-part of my copending U.S. patent application Ser. No. 06/866,395, filed May 23, 1986, now U.S. Pat. No. 4,702,903, which is itself a continuation-in-part of my U.S. patent application Ser. No. 06/538,320, filed Oct. 3, 1983, now abandoned.

BACKGROUND OF THE INVENTION

1. Field of the Invention

The invention relates generally to chemical reactions conducted in the gas or vapour phase. Reactions may be exothermic or endothermic, and may be conducted over heterogeneous catalysts or under an appropriate form of external excitation.

Some particlar applications include ammonia synthesis, methanol synthesis, Fischer-Tropsch synthesis of hydrocarbons, steam reforming reactions, hydrogenation and dehydrogenation reactions, controlled oxidation reactions, and ozone generation.

2. Prior Art

Fundamental problems in chemical process industry include management of reaction equilibrium and kinetics to achieve high conversion with desired selectivity under moderate reaction conditions, and management of the heat of reaction to control reaction temperature and to achieve efficient energy recovery.

In the usual case that single pass conversion of the feed is incomplete because of equilibrium limitations, reaction equilibrium may be shifted (after selection of a favourable nominal reaction temperature and total pressure) by separation of useful products from the reactant/product mixture, and recycle of unconsumed reactants to the reactor. It is well known in the prior art to use any of the known separation processes based on condensation, distillation, membranes, absorbents or adsorbents downstream of a gas phase chemical reactor, to separate a product fraction from the reactor effluent, and return a recycle stream of reactants back to the reactor. In many important applications, a suitable separation process cannot operate at the temperature conditions of the reaction. Then the reactor and its associated product separation system are essentially incompatible, so that reactor effluent and recycle streams must be circulated through heat exchangers. The high cost of heat exchangers, recycle compressors, and other auxiliary equipment may then result in operation at relatively severe pressure or temperature conditions to minimize the need for recycle.

High temperatures generally promote good reaction rates, but shift the equilibrium of exothermic reactions toward lower conversion. Excessively high temperature is unfavourable for catalyst life, and may result in high pressure vessel costs. It is usually desirable to control reaction temperatures in a narrow range. With strongly exothermic or endothermic reactions, it is difficult to provide adequate heat exhange though reactor vessel walls or heat exchange surfaces. The common practice of quenching the reaction by "cold shot" injection of cool feed at intervals in the catalyst bed of exothermic reactions is highly wasteful of high grade heat of reaction. An alternative common practice of dividing an exothermic reactor into multiple staged reactors in series with intercoolers is capital intensive, and only roughly approximates isothermal conditions.

High capital costs are also associated with the well known tube reactor configuration for highly exothermic or endothermic reactions, in which multiple long narrow tubes in parallel are internally loaded with catalyst and externally immersed in a heat sink or heat source medium respectively. An exothermic tube reactor may function as a boiler, while an endothermic tube reactor may be a combustion heated furnace. Tube reactors have the performance limitations of large radial heat gradients and large axial pressure drops. Because of the limitations of heat exchange through reactor walls, fixed bed gas phase reactors are sometimes unable to exploit the full activity of the best available catalysts.

Heat transfer through reactor walls invariably results in substantial losses of thermal efficiency, particularly for highly exothermic or endothermic reactions with associated large heat fluxes. Such losses are unavoidably associated with use of a power cycle with a separate working fluid (such as steam) to recover exothermic reaction heat.

The above discussed general problems of managing both the reaction equilibrium and the heat of reaction are exemplified by the important process of ammonia synthesis. This exothermic reaction takes place over a promoted iron catalyst at a typical pressure of 200 atmospheres and a typical temperature of 750 degrees K. The hydrogen and nitrogen feed gases are stringently purified (apart from minor amounts of non-reactive "inerts" such as argon and methane), and are compressed to the high working pressure. In order to remove the product and thus maintain off-equilibrium conditions over the catalyst, the gas mixture of reactants, inerts and ammonia is circulated around a "synthesis loop" between the hot catalyst bed and a cool ammonia separator/condenser. This recirculation requires a recycle compressor and a large recuperative heat exchanger. To prevent excessive catalyst heating from the exothermic reaction, temperature control is achieved either by energy inefficient quenching by injection of cool feed gas, or by heat exchange to an external waste heat power recovery system which may drive feed gas or recycle compressors. A Brayton cycle gas turbine heat recovery approach for ammonia synthesis is disclosed by Barber et al in U.S. Pat. Nos. 4,224,299 and 4,273,743; while a supercritical Rankine cycle turbine for the same purpose is disclosed in U.S. Pat. No. 3,568,438 (Meienberg). Unless the synthesis loop operates at very high pressure, a refrigeration plant is needed to condense liquid ammonia at the cool end of the synthesis loop. Means are provided for purging accumulated inerts from the loop, and often to recover valuable hydrogen from the purge gas.

Considerable research attention has been devoted to improving productivity or selectivity of catalytic chemical reactors through cyclic operation forced by periodic variation of feed composition or reaction temperature. For example, it was found (A. K. Jain et al, "Forced Composition Cycling Experiments in a Fixed-Bed Ammonia Synthesis Reactor", ACS Symposium Series 196, pp. 97–107, American Chemical Society, 1982) that forced feed composition cycling at periods of several minutes improved the productivity of the ammonia synthesis reaction at relatively low working pressures. While it has been shown that in many cases cyclic operation can improve reaction productivity or selectivity under laboratory conditions, there remains a need for full scale reactors capable of beneficially exploiting a wide range of periodic phenomena which may be based on periodic forcing of feed composition, temperature, flow or pressure to achieve improved reaction performance relative to steady state operation.

Boreskov and Matros ("Unsteady-State Performance of Heterogeneous Catalytic Reactions", Catal.Rev.-Sci.Eng., 25(4), pp. 551–590 1983) described reactors for ammonia synthesis and sulphur dioxide oxidation, in which the flow direction through the catalyst bed is reversed at intervals to exploit the heat capacity of the catalyst bed as a thermal regenerator, preheating feed gas while providing enhanced conversion. Flow reversal is achieved by directional valves at both ends of the catalyst bed, operating on the high temperature feed and reactor effluent flows. In these reactors, the flow reversal means is entirely separate from any auxiliary apparatus that may be provided for energy recovery and product separation; and the reaction is performed at essentially constant pressure.

Chromatographic effects have been found to enable some reactions to be driven beyond normal equilibrium constraints. The reverse reaction can be suppressed by opposite separation of products, as pulses of a feed reactant migrate through a catalytically active adsorbent bed in the presence of a continously flowing carrier gas, which may be a second reactant. Chromatographic reactors are disclosed in U.S. Pat. No. 2,976,132 (Dinwiddie and Morgan) and in Canadian Pat. No. 631,882 (Magee). It was found by Unger and Rinker (Ind.Eng.-Chem.Fundam. 15, p. 226 1976) that ammonia synthesis could be conducted to high conversion beyond usual equilibrium constraints at relatively low pressure, by pulsing nitrogen through a packed bed of ammonia catalyst mixed with molecular sieve adsorbent, with hydrogen as the carrier. These chromatographic reactors have severe limitations for practicable applications, including low catalyst productivity because of the time intervals between feed pulses, and the mixing of product components into a large excess of carrier gas which must be purified before recirculation. A related concept of conducting a chemical reaction within a parametric pump using catalytically active adsorbent was discussed by Apostolopoulos (Ind.Eng.Chem.Fundam. 14, p. 11, 1975), which would avoid the necessity for a carrier gas but would still have limitations of low catalyst productivity (because the desired separation is achieved only some of the time and is localized at any time to only part of the catalyst bed) and the lack of any provision for thermal energy conversion or recovery.

In principle, any thermodynamic power cycle may be coupled indirectly by heat exchangers to convert thermal energy associated with a chemical reaction. Internal combustion engines of course use a chemically reacting gas mixture as working fluid, but closed cycle engines such as the Stirling engine have not been applied to convert thermal energy associated with a chemical reaction of their working fluid, by definition of the closed cycle and also their practical limitations. It is noted that use of rapidly dissociating gases such as nitrogen tetroxide as working fluid in Brayton (gas turbine) and Stirling closed cycle engines is proposed in U.S. Pat. No. 3,370,420 (Johnson). The chosen gas dissociates to increase volume when at high temperature, and recombines to reduce volume when at lower temperature. This effect is intended to improve the cycle "work ratio", the ratio between work of expansion at high temperature and work of compression at low temperature. Use of a catalyst in the regenerator of a closed cycle Stirling engine to speed the dissociation and recombination reactions has been proposed in U.S. Pat. No. 3,871,179 (Bland), again with the object of obtaining high work ratio. In these inventions, the forward reaction is exactly cancelled by the reverse reaction over each cycle, because the gases are trapped in the engine working spaces and there are no means to drive the net reaction off equilibrium or deliver products. The dissociation and recombination reactions take place in the Stirling engine regenerator, where their heat of reaction is cyclically stored and returned to the working fluid. This heat of reaction cannot participate directly in Stirling cycle energy conversion between heat and mechanical work, as heat converted and transported by the Stirling cycle must be manifested as heat of compression or of expansion in the variable volume working spaces or cylinders of the Stirling machine.

As the above-cited Johnson and Bland inventions have no means to separate and remove any product from the reversible reaction of the working fluid, they cannot be applied to chemical synthesis processes. Therefore it has not hitherto been possible to apply the closed Stirling cycle to recover heat from exothermic chemical synthesis reactions, or to supply heat to endothermic reactions, while using the reacting gases as Stirling machine working fluid.

Pressure swing adsorption is a well known gas separation process, previously applied to purifying the feed gas to a chemical reactor and to separating the product/reactant mixture effluent from the reactor as disclosed for example by Lassmann et al (U.S. Pat. No. 4,280,824).

Further prior art relating to pressure swing adsorption applied to gas separations is outlined in my co-pending patent application Ser. No. 06/866,395. None of those references contemplates the direct coupling of a pressure swing adsorption process with a regenerative thermal power or heat pump cycle as in the present invention.

SUMMARY OF THE INVENTION

The invention reduces the difficulties and disadvantages of the prior art by providing a method and apparatus for gas phase chemical reactions which improves the yield or selectivity of such reactions, and simultaneously can also reduce the energy consumption and complexity of such prior art processes. The invention uses a relatively simple apparatus with directly integrated heat recovery and product separation systems, in which the reacting gases and products of the reaction serve as working fluid in a reciprocating regenerative thermodynamic cycle converting the heat of reaction, while products are separated from reactants in an adsorption cycle cooperating directly with the thermodynamic cycle.

The invention uses the well known Stirling cycle, or a similar regenerative thermodynamic cycle which may indeed more closely resemble the Ericsson cycle, to convert and transport the heat of reaction, with the reacting gas components acting as cycle working fluid. The reaction is conducted within, or in proximity to, a variable volume space of the Stirling machine. The heat of reaction may then be converted directly within the working fluid as net heat of expansion (exothermic reactions) or heat of compression (endothermic reactions) over each cycle, eliminating or reducing the requirement for heat exchange at reaction temperature through the walls of the reactor, and thus alleviating heat exchange and energy recovery difficulties of prior art reactors.

The invention further uses a modification of the well known separation process of pressure swing adsorption to separate the components of the reacting gas mixture, such that desired reaction products are removed from the reaction zone while reactants are concentrated into the reaction zone, so that reaction conversion and selectivity can be manipulated and the reaction equilibrium shifted to achieve high productivity. The separation is performed over an adsorbent column (integrated with the Stirling machine thermal regenerator), over which the working gas mixture is subjected to a regime of cyclic pressure variations and flow reversals generated by the Stirling cycle. Unlike prior art pressure swing adsorption separation apparatus, the adsorbent column in the modified Stirling cycle machine is in general subjected to an axial temperature gradient along the gas flow path, which provides a beneficial temperature swing effect (associated with heat convection by the reversing gas flow) improving separation performance in heat engine embodiments of the invention normally applied to exothermic reactions.

The combination of a thermal regenerator and an adsorbent column will be referred to in this specification as an "adsorbent loaded regenerator" or simply regenerator when the context is clear. The flow path through the adsorbent loaded regenerator is connected at one end to a first variable volume space and at the other end to a second variable volume space, which in general are maintained at different temperatures. The chemical reaction is conducted within or in proximity to the first variable volume space. The variable volume spaces, the flow path and associated dead volumes constitute the internal working volume of the apparatus.

The first and second variable volume spaces are varied cyclically at the same periodic frequency and with different phase, such that the gas mixture within the flow path in the adsorbent regenerator is made to flow back and forth between the first and second spaces, while the total pressure also varies cyclically in repose to changes of the total volume of the internal working volume and to movement of the gas between zones of different temperature.

The reciprocation phases of the variable volume spaces are adjusted so that a more readily adsorbed component is preferentially adsorbed (relative to a less readily adsorbed component) under increased pressure when the gas (now enriched in the less readily adsorbed component) is flowing in a particular forward or first direction along the flow path, while the more readily adsorbed component is preferentially desorbed under reduced pressure when the gas (now enriched in the more readily adsorbed component) is flowing back in the reverse or second direction. Hence the less readily adsorbed component is separated in the first direction, while the more readily adsorbed component is separated in the reverse or second direction. Since the gas will be accumulated at either end of the flow path when the pressure is changing, heat of compression will be given off at the end toward which the more readily adsorbed component is separated, and heat of expansion will be taken up at the other end toward which the less readily adsorbed component is separated. This net transport of heat (in the same direction as the more readily adsorbed fraction) is an expression of the Stirling or similar regenerative thermodynamic cycle. The Ericsson thermodynamic cycle applies to the ideal case in which the pressure is kept constant at its maximum or (minimum) level while the gas is flowing through the regenerator in the above first or second or (reverse) direction, but the more common name of the Stirling cycle will be applied to the entire class of related cycles.

A chemical reaction process under the invention is conducted between reacting species, including a gas phase reactant and a gas phase product which have different selectivities of adsorption over an adsorbent material, such that one of the reactant/product pair is a more readily adsorbed component and the other is a less readily adsorbed component. The invention (using a single adsorbent loaded regenerator) applies particularly to exothermic reactions whose product(s) are more readily adsorbed than the reactant(s), in which case the cyclic volume variations in the first variable volume space should have a leading phase with respect to the cyclic volume variations in the second space. Conversely, the invention applies particularly to endothermic reactions whose product(s) are less readily adsorbed than the reactant(s), with the phase of the cyclic volume variations in the second space leading those in the first space.

The adsorbent loaded regenerator combines the functions of storing selected gas components by adsorption and storing sensible heat. The temperature gradient over the regenerator enables the chemical reaction and the adsorptive separation to be performed at different suitable temperatures within the integrated apparatus. For endothermic reactions conducted at high temperature, the hot end of the adsorbent loaded regenerator may be too hot to perform useful adsorptive separation, but can serve as a regenerative heat sink to quench the reaction (i.e., freeze the high temperature equilibrium), while the cooler end of the adsorbent loaded regenerator does perform the adsorptive separation.

According to the invention, the reaction is thus conducted within the working spaces of a Stirling machine, which may incorporate catalyst or other means to stimulate the reaction. The Stirling machine is further modified to include adsorbent material in the flow path associated with its thermal regenerator; so that preferentially adsorbed components will be transported along the flow path in the same direction as net heat transport by the Stirling cycle (toward the cooler end for an engine, and toward the hotter end for a heat pump), while less readily adsorbed components will be transported in the reverse direction. A further essential modification in the invention is the provision of inlet and outlet means to admit feed reactants and to exhaust product from the working space, so that the modified Stirling cycle is opened to external mass exchange in distinction to the totally closed Stirling cycle of the prior art.

Cyclic variations of the internal working volume may be achieved by liquid pistons, using a condensed product of the reaction as the displacement liquid. In a preferred embodiment of the invention, two reactors are operated 180 degrees out of phase, and hydraulically coupled by oscillations of displacement liquid in a U tube.

The invention has been described with solid adsorbent material within the regenerator to immobilize a preferentially selected component when pressure is increased and to liberate that component when pressure is reduced, thus enabling pressure swing separation. The invention extends to more general ways of selectively transforming a component of the gas mixture to a less mobile phase when pressure is increased, and returning that component to the more mobile gas phase when pressure is reduced. In particular, a liquid absorbent more readily absorbing either the products or reactants of the reaction may be contained in a portion of the regenerator, in which the liquid absorbent is either immobilized in a porous support matrix or otherwise restrained to much lower flow velocities than the gas in the regenerator flow path. When a portion of the regenerator is at a temperature at which a component of the gas mixture may selectively condense under increase of pressure, and the condensate is substantially immobilized relative to the gas phase, this phase transformation may be used to achieve pressure swing separation. Adsorption is preferred because the solid phase is immobile, and the adsorption isotherms in general show a desirably sloped relation of adsorbent loading to gas phase component partial pressure, rather than a unique vapour partial pressure at each temperature.

Multiple adsorbent loaded regenerators with associated displacer pistons may be operated within a single internal working volume that may contain one or multiple reaction spaces, to achieve high flexibility in performing multicomponent separations of products and reactants, and in cascading sequential reaction and separation steps within a single integrated apparatus. In particular, an embodiment using two adsorbent loaded regenerators can achieve separation of reactants and products for reactions where the adsorptive selectivity ordering of one reactant/product component pair is opposite to that of a second reactant/product pair of the same reaction.

DETAILED DISCLOSURE

FIG. 1

Figure 1:
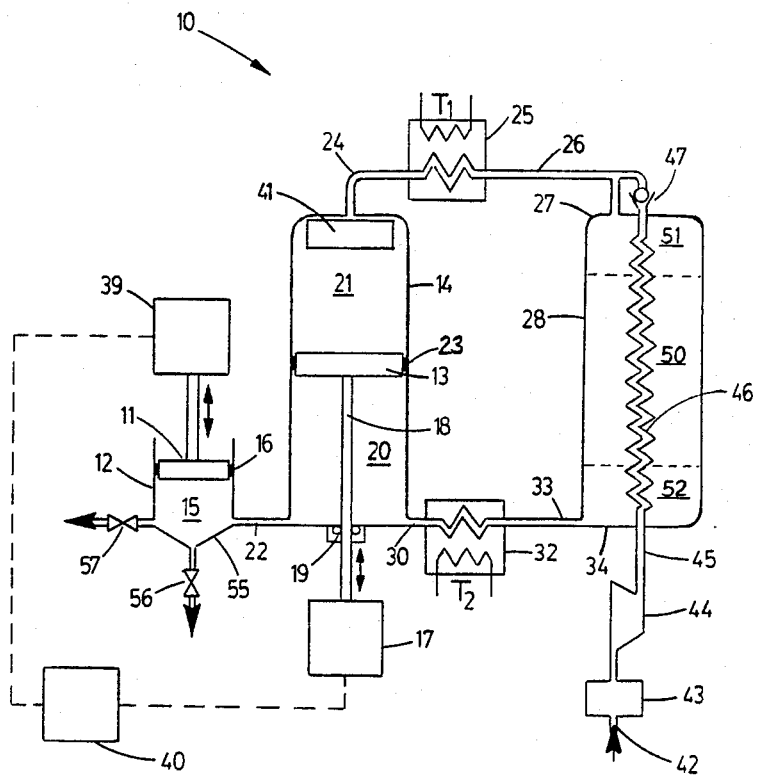
FIG. 1 is a simplified schematic of an improved gas phase chemical reactor for exothermic or endothermic reactions, with a single displacer and regenerator combination.

A Stirling cycle machine 10 has a single-acting power piston 11 reciprocating in a power cylinder 12, and a double-acting displacer piston 13 reciprocating in a displacer cylinder 14. The power cylinder encloses a variable volume 15 sealed by a high pressure seal 16 on power piston 11.

The displacer piston 13 is driven by a reciprocating displacer drive means 17, coupled by a displacer rod 18 having a cross sectional area which is small with repect to the cross sectional area of displacer cylinder 14. The displacer rod is sealed by a high pressure gland seal 19. The displacer piston 13 divides the internal volume of displacer cylinder 14 between a variable volume 20 adjacent the gland seal 19 and a variable volume 21. The variable volume 20 is connected to the variable volume 15 by conduit means 22. The variable volume 21 (plus associated dead volume of conduits, etc.) will be called the first variable volume space or simply first space of the Stirling machine, while the sum of the variable volumes 15 and 20 (plus associated dead volume) will be called the second variable volume space or simply second space of the machine. The displacer piston 13 serves as a first volume displacement means associated with the first space 21, while the power piston 11 and the displacer piston 13 jointly serve as a second volume displacement means associated with the second space (15 and 20).

Leakage between the first and second spaces past the displacer piston 13 will be prevented by sliding seal 23, which will be exposed to relatively low pressure differences. The displacer piston will normally be designed to minimize heat conduction between the first and second spaces.

The variable volume 21 is connected by conduit means 24 to a first heat exchanger 25, maintained at a temperature T1, and connected by conduit means 26 to a first end 27 of an adsorbent loaded regenerator 28. The internal volume of conduits 24 and 26 is included in the first variable volume space as a dead volume contribution. The variable volume 20 is connected by conduit means 30 to a second heat exchanger 32, maintained at a temperature T2 which will often approximate ambient temperature, and in turn connected by conduit means 33 to a second end 34 of the thermal regenerator 28. The internal volume of conduits 30 and 33 is a dead volume contribution to the second variable volume space.

The adsorbent loaded regenerator 28 provides a flow path between its first and second ends 27 and 34, and contains adsorbent material as well as material with heat capacity disposed along the flow path and contacting the gas therein. The material in the regenerator 28 exchanges heat cyclically with the reversing gas flow in the flow path and thus maintains approximately isothermal conditions at each point of the flow path. This flow path through the regenerator connects the first and second variable volume spaces, which are thus at the same pressure apart from pressure drops due to flow friction.

It is evident that gas within the first space will be maintained approximately at a first temperature T1, while gas in the second space will be maintained approximately at a second temperature T2. In general, a temperature gradient between T1 and T2 will be maintained in the flow path between the first and second ends of the regenerator 28. The first and second spaces, and the internal volume of the regenerator, constitute the internal working volume of the apparatus.

Reciprocation of the power piston 11 is coordinated by mechanical power conversion means 39, which cooperates with displacer drive means 17 operating at the same periodic frequency and with an appropriate phase shift to achieve desired phase relationships between cyclic volume displacements in the first and second spaces. The relative phase between the pistons is controlled by phase control means 40. It may be noted that the power piston changes the total internal working volume of the apparatus 10 and thus accepts or delivers mechanical power at any instant according to the direction of piston movement and the pressure within the second space, while movement of the displacer piston causes flow in the flow path through the regenerator without significant volume changes or mechanical power requirement since frictional pressure drops in the flow path should be low.

In accordance with the usual terminology in the Stirling cycle art, whichever of the first or second spaces has a leading phase of its cyclic volume displacements with respect to the other space will be called the expansion space, while the other space will be called the compression space. The phase angle between cyclic volume displacements in the expansion and compression spaces may in principle be any angle from 0 to 180 degrees, but usually will be in the range of 45 to 135 degrees.

Pressure of the working fluid gas within the internal working volume will change cyclically in response both to changes of the total internal working volume by the power piston, and to changes in the average temperature of the working fluid heated or cooled by flow through the regenerator through action of the displacer piston. The gas will take up heat of expansion when pressure is reduced, and will give up heat of compression when pressure is increased. The above defined phase relationships ensure that more moles of gas are present in the expansion space when the pressure is being reduced than when the pressure is being increased, so net heat of expansion will be taken up or lifted by the working fluid in the expansion space over each cycle. Conversely more moles of gas will be present in the compression space when the pressure is being increased than when the pressure is being decreased, so net heat of compression is released or delivered by the working fluid in the compression space over each cycle. Hence, the Stirling cycle lifts heat from its expansion space and delivers heat to its compression space. Net work is performed by the working fluid at the expansion space and performed on the working fluid at the compression space.

As the expansion and compression spaces correspond to the first and second spaces which are maintained at approximately constant temperatures $T1$ and $T2$ respectively, and the regenerator has substantial heat capacity relative to the working fluid, more or less isothermal conditions exist locally at every point within the internal working volume. Since isothermal work and heat of expansion and compression are proportional to the local absolute temperature, any temperature difference between the expansion and compression spaces will result in net conversion between work and heat. If the expansion space is hotter than the compression space, the Stirling cycle will operate in an engine mode delivering a theoretical excess of expansion work output over compression work input, while accepting higher grade heat at the expansion space and rejecting lower grade heat at the compression space. If the expansion space is cooler than the compression space, the Stirling cycle will operate in a heat pump or (at lower temperatures) refrigeration mode, applying net mechanical work input to deliver higher grade heat to the compression space while lifting lower grade heat from the expansion space.

In the present invention, a chemical reaction is conducted in a reaction space which is within or adjacent to the first variable volume space. The reaction may be exothermic or endothermic, and may be conducted with or without catalysts. While catalysts are a passive reaction stimulation means, other reactions may be energized by active reaction stimulation means such as electric arc, electric discharge, visible light or other radiation. FIG. 1 shows reaction stimulation means 41 in the first space 21. The location of the reaction space is then defined by the reaction stimulation means, which would desirably be distributed in the first space to achieve direct exchange of heat of reaction with the net heat of expansion or compression associated with cyclic volume variations of the first space. An active reaction stimulation means may be pulsed at the periodic frequency of the variable volume displacements, and with suitable phase to enhance the rate of reaction and bring the heat exchanges within the first space into phase.

Reaction stimulation means 41 may be a heterogeneous catalyst bed, communicating with conduit 24. Alternatively, reaction stimulation means 41 may be the entry point for an externally generated beam exciting photolytic or radiolytic reactions, or may be a transducer for acoustic or electromagnetic excitation with an external power supply. In the particular example of ozone generation by electric discharge, reaction stimulation means 41 would represent suitable electrodes and dielectric, while the discharge gap between the electrodes would constitute a portion of the first variable volume space.

When a fixed bed of catalyst is used as a passive reaction stimulation means, some benefits may be obtained by the cyclic operating regime imposed by the apparatus of the invention on the catalyst. The pressure is varied cyclically, while the flow over the catalyst is reversing at the same frequency. Secondary variations in gas composition and temperature over the catalyst will result from the operating regime. Cyclic injection of the feed (either through a non-return valve responding passively to pressure variations, or an actively operated directional valve) may be used to amplify variations of reactant composition over the catalyst. Since the gas mixture flows twice over the catalyst, i.e. bed in each direction, once before returning to the adsorbent loaded regenerator for selective removal of the reaction products, the gas flow over the catalyst will be relatively enriched in the products when flowing in the direction from the first space to the regenerator. It is well known that periodic cycling of such parameters as reactant/product composition, temperature and pressure can usefully enhance the productivity or selectivity of gas phase reactions over heterogeneous catalysts. The present invention provides versatile means to cycle the above parameters periodically, with considerable flexibility to tune operating conditions for best performance in each application.

In some applications, it may be desired to achieve higher velocity circulation over the catalyst, to maintain flow over the catalyst even when flow in conduit 24 is momentarily stopped during a reversal of flow direction, or to have unidirectional flow over the catalyst. Reaction stimulation means 41 may then include an internal recirculation device such as a fan or blower generating supplementary flow through the catalyst bed.

The invention may be used to conduct reactions with homogeneous gas phase catalysts, when the adsorptive selectivity of the catalytic component is similar to the reactants (relative to the products), so that the catalytic component is separated with the reactants and away from the products. Then the catalytic component can be trapped in the reaction space. In the example of an exothermic reaction whose reactants are less readily adsorbed relative to the products, a homogeneous catalyst gas component should also be less readily adsorbed.

In order for the reaction to proceed, a feed gas including at least one reactant must be supplied to the reaction space, and the desired product or products of the reaction must be removed. In FIG. 1, the raw feed is admitted through the feed conduit 42, treated and purified as may be necessary in pretreatment system 43, compressed if necessary by compressor 44, and conveyed through conduit 45 to heat exchanger 46. The gas is heated by heat exchanger 46 in the regenerator 28 to temperature T1. and is admitted by non-return valve 47 to conduit 26 communicating with the first space 21 and the reaction space therein.

The reacting gas mixture in the first space includes the reactant(s) and at least one product of the reaction. In the invention, the product(s) are separated from the reactants(s) by pressure swing adsorption. Conduits 24 and 26 provide means to convey the mixture of product(s) and reactant(s) from the reaction space to the adsorbent loaded regenerator 28. The regenerator 28 contains an adsorbent column contacting gas in the flow path through the regenerator, with the adsorbent material in the column having different adsorption selectivity for a reactant and a product of the reaction. Under the range of pressure and temperature conditions within the regenerator, either the reactant or the product is a more readily adsorbed component and the other is a less readily adsorbed component. The expression "more readily adsorbed" is taken in the dynamic sense that the change in loading of the adsorbent under a given pressure change (under typical operating conditions) is greater for a more readily adsorbed component than for a less readily adsorbed component. The selectivity difference may be based upon differing equilibrium adsorption coefficients, or on differing kinetic adsorption rate coefficients. Selectivity will vary with temperature, working pressure range, and the cycle periodic frequency.

The adsorbent material in the adsorbent loaded regenerator may be layered with different properties according to the local temperature in different portions of the regnerator, reflecting the strong temperature sensitivity of adsorption equilibrium and diffusivity coefficients. A central portion 50 of the regenerator is exposed to temperature approximately midway between T1 and T2, while an upper portion 51 of the regenerator is exposed to temperatures approaching T1 and a lower portion 52 is exposed to temperatures near T2. The necessary heat capacity of the regenerator is provided in part by the adsorbent material, supplemented if desired by additional thermal ballast material which may support the adsorbent.

For some processes, the adsorbent material in regenerator 28 may be catalytically active. If upper portion 51 of the regenerator contains catalyst, the corresponding heat of reaction can be convectively transported to or from the adjacent first variable volume space.

In some endothermic dissociation reactions conducted in the first space with very high T1, and whose equilibrium at somewhat lower temperatures favours the reverse reaction, upper portion 51 of the regenerator will have limited adsorptive capacity owing to the high temperature, but may play the useful function of quenching the reaction to enhance productivity of the dissociated products which will be separated in the cooler portions of the regenerator 50 and 52. The hot products of reaction leaving the first space 21 are cooled rapidly in the upper portion 51 of the regenerator to lower temperatures at which the rate of the reverse reaction becomes sufficiently low, thus "freezing" the high temperature equilibrium and permitting recovery of the products by adsorption in the cooler lower portions of the regenerator.

Numerous adsorbent column configurations are possible, consistent with the design objectives of providing a large contact area between the adsorbent and the gas mixture, and providing a well defined flow path through the regenerator. The flow path should have low frictional pressure drop and low dead volume. In the usual case that the flow path constitutes a multiplicity of parallel flow channels, these channels should be closely similar in their hydraulic and adsorbent loading characteristics to minimize axial dispersion of concentration wavefronts. In the usual case that T1 and T2 are unequal, it will be necessary to design the regenerator 28 (and also the displacer piston 23 and displacer cylinder 14) to minimize static heat conduction between the first and second spaces.

The adsorbent loaded regenerator may be a simple packed bed of adsorbent pellets, perhaps with intermingled metallic material to increase heat capacity, as suggested in FIG. 1. Alternatively, the regenerator may be configured as multiple parallel flow passages (as suggested in FIGS. 2 and 3) defined by structures of tubes, honeycombs, or stacked parallel plates. These structures may be formed of adsorbent material (such as carbon or alumina), or may be formed of metal or ceramic with a suitable adsorbent coating. In all cases, it will be necessary to provide large adsorbent surface area.

Since the role of the adsorbent is to immobilize preferentially either the product(s) or reactant(s) under increase of pressure, and to release the immobilized component(s) when pressure is decreased, the invention includes other means of selectively immobilizing gas components under change of pressure. Many liquid absorbents are known which can absorb certain gas components with high selectivity and capacity. A liquid absorbent immobilized in a porous matrix within the regenerator, or simply coating the channels of the flow path, may substitute for solid adsorbents within the scope of this invention.

When a vapour is near its condensation temperature, the pores of solid adsorbents may become filled with liquid, impairing adsorption efficiency. However, condensation itself may be used to transform the vapour component into a less mobile phase (relative to the gas phase), and is thus included within the invention as a substitute for adsorption. The thermal storage function of the regenerator would be seriously disturbed if the condensate were allowed to flow freely with the gas/vapour mixture, so the regenerator matrix in this case should be configured to allow free gas flow while impeding movement of liquid droplets. When $T1 > T2$, central portion 50 of the regenerator may be loaded with adsorbent to perform adsorptive separation, while lower portion 52 of the regenerator may operate in a reversible condensation mode.

Through the cyclic variation of the first and second variable volumes at the same periodic frequency and with different phase, cyclically reversing flow is generated in the flow path within the regenerator 28. The total pressure also varies cyclically between maximum and minimum pressure limits, with a phase coordinated such that the pressure is relatively increased when the gas mixture in the flow path is flowing in the direction toward the expansion space, and the pressure is relatively reduced when the flow direction in the flow path is reversed toward the compression space. This phase correlation between variations in total pressure and flow direction in the regenerator is a consequence of the Stirling cycle function, under which the working fluid mass is concentrated in the expansion space when pressure is reducing, and in the compression space when pressure is increasing.

A more readily adsorbed component of the gas mixture in the regenerator will be preferentially adsorbed on the adsorbent material in the regenerator under increased pressure when the gas mixture is flowing along the flow path in the direction toward the expansion space, and thus gas flow toward the expansion space will be enriched in the less readily adsorbed fraction of the mixture. Conversely, the more readily adsorbed component will be desorbed and free to move with the flow when the pressure is decreased and the flow direction in the flow path is reversed toward the compression space, so that gas flow toward the compression space will be enriched in the more readily adsorbed component. Since heat is removed (as net heat of expansion) from the expansion space, and heat is delivered (as net heat of compression) to the compression space, it is seen that the combined Stirling/pressure swing adsorption cycle of the present invention transports both heat and more readily adsorbed component(s) in one direction toward the compression space, and transports less readily adsorbed component(s) in the reverse direction toward the expansion space.

In the reactor embodiment of FIG. 1, the phase relations between pressure and regenerator flow will be coordinated to achieve pressure swing adsorption separation of the reactant toward the first end 27 of the regenerator, and of the product toward the second end 34 of the regenerator. Product concentrated in the second space may be removed continuously or cyclically through product discharge valve 56. In applications where the product is condensible at temperature T2, a portion of the power cylinder 12 may be configured as a condensate separator 55, so that liquid product is delivered through discharge valve 56. If a noncondensible more readily adsorbed product or inert gas component tends to accumulate in the second space, such accumulations may be removed through purge valve 57.

If the product(s) is more readily adsorbed than the reactant(s), the first space must be the expansion space and the second space must be the compression space, as defined by a leading phase angle of volume changes in the expansion space relative to volume changes in the compression space. Since the apparatus then removes net heat of expansion over each cycle from the first (expansion) space, this heat may be provided in part by heat of an exothermic reaction. If T1 is greater than T2, as would be the typical case for an exothermic reaction, the Stirling cycle will operate in an engine mode converting the heat of reaction.

Hence, this embodiment of the invention is well suited to exothermic reactions, whose product(s) are more readily adsorbed and whose reactant(s) are less readily adsorbed over a suitable adsorbent. The invention then shifts reaction equilibrium by removing the product(s) while trapping the reactant(s) in the reaction space, while recovering the exothermic heat of reaction through the modified Stirling cycle. The mechanical energy converted by the Stirling cycle will be applied internally against mechanical and flow friction losses, and dissipation of energy associated with cyclic adsorption and desorption. Any excess mechanical energy converted may be accepted usefully by power conversion means 39.

If the reactant(s) is more readily adsorbed than the product(s), the first space must be a compression space and the second space must be an expansion space in order to achieve the necessary direction of separation. Then net heat of compression is delivered to the first (compression) space over each cycle, and this heat may be accepted by an endothermic reaction. Hence this embodiment of the invention is ideally suited to endothermic reactions, whose product(s) are less readily adsorbed and whose reactant(s) are more readily adsorbed. In the usual case that T1 exceeds T2, the Stirling cycle operates in a heat pump mode, accepting heat at T2 and delivering higher grade heat at T1 to the reaction, while drawing mechanical power from power conversion means 39.

EXAMPLE 1

Ammonia synthesis is performed in the apparatus 10 by the exothermic reaction

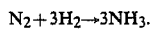

$$N_2 + 3H_2 \rightarrow 3NH_3.$$

It is desired to remove heat and the readily adsorbed product ammonia from the first space, while trapping the reactants in the reaction zone to achieve full conversion of hydrogen. Hence, phase relationships are set so that volume changes in the first space have a leading phase with respect to volume changes in the second space.

A feed mixture of hydrogen and nitrogen is purified in pretreatment system 43 (particularly to remove all oxygen compounds) and is supplied to feed valve 47 at a feed pressure of about 25 to 30 atmospheres. The total pressure in the internal working volume cycles periodically between the feed pressure of about 25 to 30 atmospheres and the upper pressure of about 50 atmospheres, at the piston reciprocation cycle rate of about 5 to 10 RPM. A promoted iron ammonia catalyst bed 41 is located in the first space 21, whose temperature T1 is maintained at about 450 to 500 degrees Celsius. Molecular sieve 13X or other suitable adsorbent will adsorb ammonia much more readily than nitrogen or hydrogen, and is loaded in regenerator 28. The temperature T2 of the second space is maintained at about 30 degrees Celsius by cooling water, and liquid ammonia is condensed in separator 55.

Under the described conditions, the heat of reaction will be accepted as net heat of expansion in the first space by the modified Stirling cycle. Ammonia will be separated toward the second space and hydrogen will be separated with nitrogen to the first space. The low partial pressure of ammonia over the catalyst (in or adjacent to the first space) will shift reaction equilibrium to suppress the reverse ammonia dissociation reaction, and thus enable high reaction rate despite the relatively low total pressure. It is well known that productivity of ammonia synthesis catalyst is greatly enhanced when ammonia concentration is low.

The much higher working pressure of conventional ammonia synthesis processes (typically 100 to 200 atmospheres) reflects their inability to achieve low concentration of ammonia over the catalyst because of their dependence on ammonia separation by low temperature condensation and the impracticability of circulating the reacting gas mixture around the loop between high temperature catalyst and low temperature condenser at very high rates. The present invention achieves separation within the internal working volume of the reactor, and can thus achieve low ammonia concentration over the catalyst, consistent with the objective of achieving high productivity at low total pressure.

Because hydrogen can be generated by either steam reforming of methane or electroysis of water at a delivery pressure of about 25 atmospheres, feed compressor 44 may be eliminated. The exothermic heat of reaction is converted in part to the mechanical energy required to operate the apparatus and provide the final stage of compression from the feed pressure to the working pressure which is higher most of the time. Excess mechanical energy is recovered by mechanical power conversion means 39.

An adsorbent such as molecular sieve 13X will separate ammonia strongly from hydrogen and nitrogen, while also achieving some separation between hydrogen and nitrogen. Any inert components such as argon and methane will be concentrated with nitrogen in an intermediate zone between the first space where hydrogen is concentrated most strongly, and the second space where ammonia is separated. Hydrogen-depleted purge gas containing mostly nitrogen and the inert components may be withdrawn from valve 57 as required to prevent excessive inert gas accumulation.

The apparatus described for the ammonia synthesis process integrates the functions of product separation and heat recovery in a manner expected to provide great benefits of improved efficiency, lower pressure operation and radical process simplification.

EXAMPLE 2

The invention may be applied to numerous endothermic reactions, including steam reforming and dehydrogenation reaction. In this example, methanol is steam reformed to generate hydrogen rich fuel for combustion engines or fuel cells. The reactants methanol and steam are more readily adsorbed over common adsorbents such as activated carbon than the products hydrogen, carbon dioxide and carbon monoxide produced by the reactions $$CH_3OH + H_2O \rightarrow 3H_2 + CO_2$$

$$CH_3OH \rightarrow 2H_2 + CO$$

Since the reaction is endothermic and the reactants are more readily adsorbed than the products, the apparatus will be operated with a leading phase of volume changes in the second space relative to volume changes in the first space. Then the reactants will be trapped in the reaction zone, the products will be removed from the reaction zone, and net heat of compression will be delivered to the reaction zone as a contribution to the heat of reaction.

The reaction is typically conducted over a copper-zinc catalyst, at a reaction temperature of about 250 degrees Celsius. The invention will enable improved productivity from the catalyst, since the high concentration of methanol over the catalyst will favour the forward reaction, while the low concentration of products over the catalyst will inhibit the reverse methanol synthesis reaction. The invention makes it possible to maintain a high partial pressure of steam over the catalyst, while supplying no more than a small excess of steam above the stoichiometric demand of the reaction. The elevated steam concentration will inhibit any tendency toward carbon deposition on the catalyst, and will shift the equilibrium of the water gas shift reaction to produce carbon dioxide rather than carbon monoxide, thus enhancing the purity and productivity of hydrogen.

This example shows the ability of the invention to achieve full conversion of reactants, while also improving selectivity toward hydrogen (with carbon dioxide byproduct) and away from carbon monoxide. The invention also relieves heat transfer difficulties by providing at least part of the endothermic heat directly as net heat of compression provided by the modified Stirling cycle.

EXAMPLE 3

Ozone is generated by the endothermic reaction $$3O_2 \rightarrow 2O_3$$

which is energized by a high voltage electric discharge in a gap between a pair of electrodes, with a suitable dielectric layer over one of the electrodes. Because of the low efficiency of the discharge in providing its energy to the completed reaction, excess heat is generated in the reaction zone which thus must be cooled as if the reaction were exothermic. As the reverse ozone decomposition reaction proceeds more rapidly at high temperatures and in the presence of elevated ozone concentrations, it is very important to provide effective cooling of the discharge gap and to remove produced ozone as rapidly as possible. Since ozone is produced best using a feed of dehydrated and enriched oxygen rather than air, it is desirable to recycle the oxygen.

It is well known that ozone is adsorbed more readily than oxygen over silica gel, particularly at lower temperatures where silica gel will also show low activity in catalyzing ozone decomposition. Hence, the invention can be applied to generate ozone, with the discharge gap constituting a portion of the first space, with silica gel loaded in the regenerator, and with the phase of volume changes in the first space leading volume changes in the second space. Then heat and ozone will be removed from the reaction space, while oxygen will be concentrated there. In applications where ozone is to be dissolved in water, liquid water may be introduced and removed cyclically in the second space, absorbing the produced ozone while acting as direct coolant. Since water is a more readily adsorbed component on silica gel, water vapour will be trapped in the second space and kept out of the reaction space as required.

EXAMPLE 4

Methanol may be produced by controlled oxidation of methane according to the highly exothermic reaction $$2CH_4 + O_2 \rightarrow 2CH_3OH.$$

A variety of catalysts have been investigated for this reaction, which may typically be conducted at a temperature of 400 degrees Celsius. It has been found difficult to achieve high yield by suppressing the side reactions forming carbon monoxide and carbon dioxide. However, it has been shown that high kinetic selectivity to methanol can be achieved by operating under properly controlled conditions at very low conversion (Hunter et al, preprint, 35th Canadian Chemical Engineering Conference, 1985).

The present invention may be applied to the controlled oxidation of natural gas to methanol, with the reaction performed in the first space whose volume is varied with a leading phase relative to volume variations of the second space. The regenerator may be loaded with carbon adsorbent. The fuel rich feed mixture of methane and oxygen will be trapped in the first space until reacted, while methanol will be transported to the second space and condensed there. The concentration of methanol in the reaction zone within the first space will be kept low by the adsorptive separation, so that high selectivity to methanol can be achieved. The apparatus will also recover the exothermic heat of reaction, operating in the engine mode.

Alternatively, the regenerator may be loaded at least in part with catalytically active adsorbent, so that methanol formed in the first space will be converted to a different product. It is known that alumina or molecular sieve adsorbents (such as 13X) catalyze the dehydration of methanol to dimethyl ether, while certain high silica molecular sieves such as ZSM-5 catalyze the further dehydration of methanol to a mixture of olefinic, paraffinic and aromatic hydrocarbons which may be useful as high octane gasoline. The water of dehydration is delivered as a byproduct in the second space. In this embodiment with ZSM-5 as the catalytically active adsorbent loaded in upper portion 51 of the regenerator, and with oxygen as the supplementary feed, the invention provides a direct conversion procesds for converting natural gas into gasoline within a single integrated reaction apparatus.

EXAMPLE 5

Methanol is synthesized over copper-zinc catalysts (or less active nickel-chromium catalysts) by the exothermic reaction

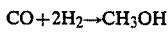

$$CO + 2H_2 \rightarrow CH_3OH$$

whose product and typical side-products are more readily adsorbed than the reactants. Hence, the invention may be applied directly with carbon adsorbent loaded in the regenerator, and with the apparatus operating in its engine mode. The separation of the product to the second space will result in a low concentration of methanol over the catalyst, inhibiting the back reaction and enabling operation at lower than normal total pressure.

The selectivity of the process may be manipulated by appropriate choice of adsorbent and the pressure cycling regime. Side reactions producing higher alcohols and other oxygenates would be inhibited if the adsorbent is a carbon molecular sieve selectively excluding the larger molecules by size and consequent low diffusivities relative to methanol. Conversely, selectivity to any side product may be enhanced by using a relatively open pore adsorbent, with greater equilibrium capacity of adsorption for the particular side product relative to methanol.

FIG. 2

A second embodiment 100 of the invention includes two reactor modules, operated 180 degrees out of phase and hydraulically coupled through the use of liquid pistons as power pistons, and the interconnection of the two liquid pistons is a way of a continuous liquid column in a U tube. This hydraulic coupling permits a degree of load balancing between the two power pistons, and reduces the practical or economic difficulties of providing large reciprocating forces at low speed (say 10 RPM) that would be encountered with a purely mechanical power piston and power conversion means. For an exothermic reaction producing a condensible product, the condensed product may be the liquid of the liquid pistons. For an endothermic reaction with a condensible reactant (such as water), that reactant may provide the liquid piston medium.

Embodiment 100 will be described with reference to the left and right sides of FIG. 2. Liquid 101 fills the U tube 102 which connects the left reactor vessel 103 and the right reactor vessel 104. The left and right reactor vessels are mounted vertically above the U tube to provide gravity separation of the liquid 101 from the gas mixture in each of the reactor vessels, and are configured as vertical axis cylinders.

A left displacer piston 105 is disposed in the left reactor vessel 103, and is reciprocated vertically by left displacer actuator 106 coupled through left displacer rod 107. Likewise, right displacer piston 110 is reciprocated vertically in the right reactor vessel 104 by right displacer actuator 111 coupled through right displacer rod 112. The pistons 105 and 106 serve as first and second volume displacement means respectively. Displacer rod penetrations through the walls of the U tube are sealed by left and right displacer rod seals 113 and 114. Fluid bypass past the left and right displacer pistons is prevented by sliding seals 115 and 116 respectively. The displacer actuators are driven 180 degrees out of phase, and may be any type of linear actuator (hydraulic, pneumatic or electric), or may be substituted by an equivalent crank mechanism driving the displacer rods. Displacer piston actuation forces should be relatively small, and displacer actuation phasing is controlled by displacer phase control means 117.

The free surfaces of liquid 101 form a left liquid piston 120 at the bottom of left reactor vessel 103 and a right liquid piston 121 at the bottom of right reactor vessel 104. Motion of the liquid pistons will be in opposite phase when the volume of liquid in U tube 102 is constant, and will be proportional to liquid flow in the U tube. Hydraulic power conversion means 125 converts the liquid flow with mechanical linear or rotary motion, and also interconverts liquid pressure differences between the left and right sides of the U tube with mechanical force or torque, so that hydraulic power associated with liquid flow in the U tube is converted with mechanical power. For an engine mode embodiment, hydraulic power conversion means will deliver mechanical power to a suitable load means 126.

Hydraulic power conversion means 125 should act symmetrically for flow in either direction, and may operate as a power absorbing turbine (or hydraulic motor) for embodiments operating in an engine mode, or as a power delivering pump for embodiments operating in a heat pump mode. A double-acting piston at the midpoint of U tube 102 provides a simple hydraulic power conversion means converting flow motion directly to linear mechanical motion, which may be applied in the engine mode to pumping a secondary fluid. Alternative hydraulic power conversion means converting between flow and rotary mechanical motion include reversible hydrostatic motors or pumps, reversible hydrodynamic turbines or pumps, and over centre controllable pitch propeller turbines or pumps.

Figure 2:
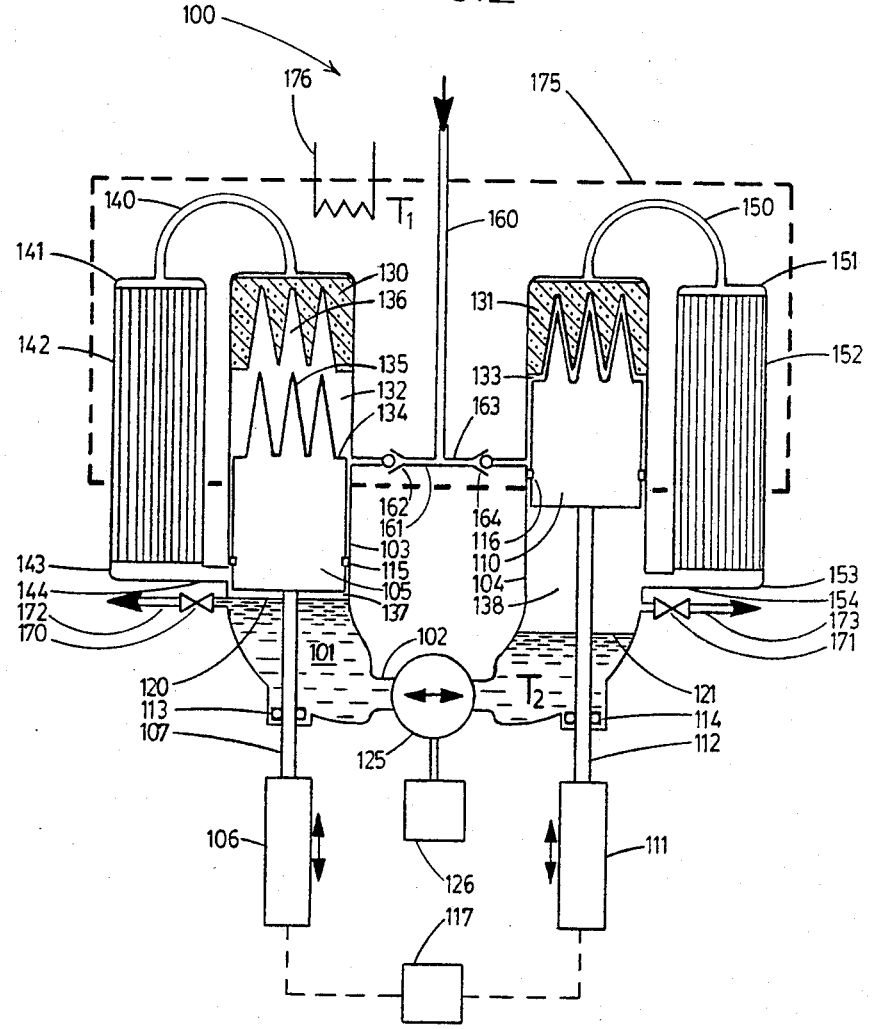
FIG. 2 is a simplified schematic of a double chemical reactor for exothermic reactions, in which condensed liquid product serves as displacement medium to vary the internal working volumes.

The reaction is conducted in left and right catalyst beds 130 and 131 respectively, which are suitably supported to maintain a geometry with a controlled low clearance to the displacer piston in its closest approach (shown on the right side of FIG. 2). The left and right first variable volume spaces 132 and 133 are defined by the swept volume between the respective displacer pistons and catalyst beds. The first variable volume spaces are maintained approximately at an elevated temperature T1. Referring to the left side of FIG. 2, it may be noted that the hot side 134 of the displacer piston 105 has projections 135 which nest into corresponding cavities 136 in catalyst bed 130, as shown on the right side of FIG. 2, providing optimum direct heat transfer between the catalyst beds and the first variable volume spaces. The hot side surface 134 of the displacer piston may also be coated with catalyst.

The liquid 101 is maintained at a second temperature T2, which may approach ambient temperature by heat exchange through the walls of U tube 102. Left and right second variable volume spaces 137 and 138 are defined by the swept volumes between the displacer pistons and the liquid pistons.

The left first variable volume space 132 is connected through catalyst bed 130 and conduit 140 to a first end 141 of left regenerator 142, and by a flow path through regenerator 142 to a second end 143 of the regenerator which is connected by conduit 144 to the left second variable volume space 137. Likewise the right first space 133 is connected via catalyst bed 131 and conduit 150 to a first end 151 of right regenerator 152, and by a flow path within the regenerator to a second end 153 of the regenerator which is connected by conduit 154 to the right second space 138.

Regenerators 142 and 152 include material with heat capacity and adsorbent material contacting the gas in the flow path of each regenerator, which may be in the form of parallel tubular or honeycomb passages as suggested by FIG. 2.

The following further description applies to exothermic reactions of the form $$A+B \rightarrow C+D$$

in which the products C and D are more readily adsorbed (and desorbed) on the selected adsorbent components materials than the reactants A and B which are thus less readily adsorbed components.

Specific examples include ammonia synthesis, methanol synthesis, and the Fischer-Tropsch synthesis of liquid hydrocarbons. Each of these example reactions produce a product which is liquid at ambient temperature and reaction working pressures.

A feed stream containing the reactants is admitted to the apparatus 100 through conduit 160 at a pressure just slightly in excess of the minimum cycle pressure in the reactor vessels. Conduit 160 branches into left feed conduit 161 conveying half of the feed stream though non-return valve 162 into the left reactor vessel 103, and right feed conduit 163 conveying the other half of the feed stream through non-return valve 164 into the right reactor vessel 104.

The entire high temperature portion of apparatus 100 is enclosed in an insulated enclosure 175, within which heat exchange occurs to preheat feed gas entering through conduit 160. External heat exchanger 176 provides the function of start up heater, bringing the gases in the left and right first spaces to approximately T1 by heat exchange with conduits 140 and 150.

Products C and D are concentrated to high partial pressures in the second spaces, where they may condense at least partially into liquid 101. Product is withdrawn from left and right product delivery valves 170 and 171, through product delivery conduits 172 and 173 respectively.

FIG. 3

A third embodiment 200 of the invention has two regenerators and associated displacer pistons cooperating with a single power piston within a single reactor vessel 201. Each regenerator may contain adsorbent material, so that two separations may be performed simultaneously within the apparatus.

This embodiment has three major classes of applications:

(1) performing two reactions sequentially where both reactions are exothermic (or endothermic).

(2) performing two reactions sequentially, where one reaction is endothermic and the other is exothermic.

(3) performing a single reaction of the general form $A \leftrightarrow B+C$, where B is more readily adsorbed than A while C is less readily adsorbed than A, so that two separations are necessary to separate the product(s) and reactant(s). This case is typical of many hydrogenation and dehydrogenation reactions, where C is hydrogen which is very weakly adsorbed on most common physical adsorbents.

Figure 3:
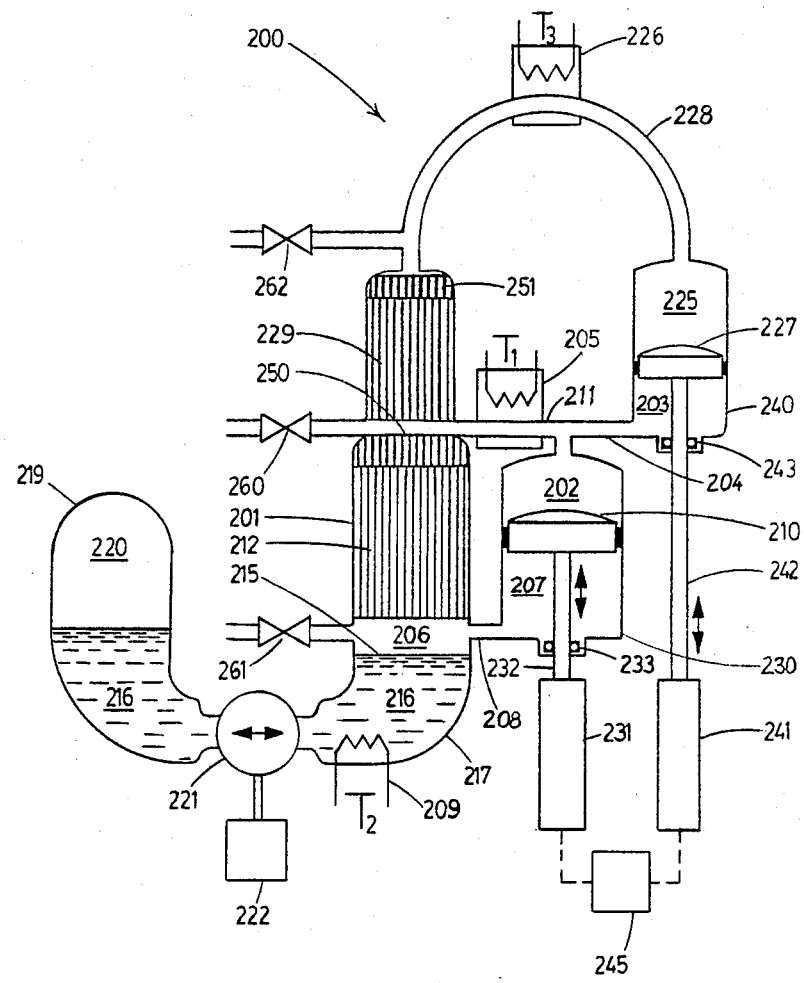
FIG. 3 is a simplified schematic of a compound chemical reactor with two displacers and adsorbent loaded regenerators so that two separations may be performed simultaneously, and provision for one or two reaction spaces.

Referring to FIG. 3, the apparatus has a first variable volume space, including chambers 202 and 203 and interconnecting conduit 204, maintained approximately at temperature T1 by heat exchanger means 205. A second variable volume space, which is the sum of volumes of connected chambers 206 and 207 and interconnecting conduit 208, is indirectly maintained approximately at temperature T2 by heat exchanger means 209. A first displacer piston 210, serving as a first volume displacement means, generates flow between the first and second spaces in a first flow path through conduit 211 and a first regenerator 212 associated with the first displacer piston.

The volume of the second space primarily the chambers (206 and 207) is varied in part through action of the first displacer piston 210 on chamber 207, and also through motion of a power piston, here provided by liquid piston 215 which varies the gas volume in chamber 206 by displacement of liquid 216 flowing back and forth in a U tube 217. The U tube could connect to another reactor vessel operating with opposed phase as described in FIG. 2, but in the example of FIG. 3 simply connects the liquid piston 215 to an accumulator chamber 220 filled with pressurized gas or vapour. Fluid power conversion means 221 similar to that described for FIG. 2 converts the power associated with liquid flow in the U tube 217 with mechanical power means 222.

This embodiment includes a third variable volume space 225 maintained approximately at temperature T3 by heat exchanger 226. A second displacer piston 227 generates flow between the third space 225 and the first space primarily the chambers (202 and 203) in a second flow path through conduit 228, a second regenerator 229, and conduit 211 which also connects as described to the first regenerator 212. The volume of the third space 225 is varied solely by action of the second displacer piston 227, while the volume of the first space (202 and 203) is changed by both displacer pistons 210 and 227 acting respectively on chambers 202 and 203.

The first displacer piston 210 is reciprocated in first displacer cylinder 230 by first displacer actuator means 231, connected by first displacer rod 232 which is sealed by gland seal 233. The second displacer piston 227 is reciprocated in second displacer cylinder 240 by second displacer actuator means 241, connected by second displacer rod 242 which is sealed by gland seal 243. The relative phase of the first and second displacer actuator means 231 and 241 is coordinated by displacer phase control means 245. The second displacer is shown with smaller displacement than the first displacer, so that the swept volume of chamber 225 is smaller than the swept volume of chamber 202.

Displacer piston 227 acts as a third variable displacement means changing the volume of the third space, while displacer pistons 210 and 227 cooperate as the first variable displacement means changing the volume of the first space, and liquid piston 215 and displacer piston 210 cooperate as the second volume displacement means changing the volume of the second space. The relative phases of the three volume displacement means are coordinated to achieve the desired phasing of flow and pressure variations in each adsorbent loaded regenerator.

A first reaction space is associated with the first space (202 and 203), and is here shown as first catalyst bed 250 located in the flow path between first regenerator 212 and the first space connected by conduit 211. The first catalyst bed 250 also communicates with the second regenerator 229 at its connection to conduit 211. In applications where two reactions are conducted within the apparatus, a second reaction space would be associated with the third space 225. FIG. 3 shows an optional second reaction space as second catalyst bed 251 located in the flow path between the third space 225, conduit 228 and second regenerator 229. It is evident that the reaction in the first reaction space will proceed at approximately temperature T1, while a second reaction may be conducted in the optional second reaction space at approximately temperature T3.

Externally connected valves 260, 261 and 262 are provided to transfer fluid into or out of the first, second and third spaces respectively, as required to supply feed reactants, deliver reaction products, or remove purge gas.

Since frictional pressure drops within the regenerators, catalyst beds and conduits of the apparatus should be kept low by design, the total pressure within reactor vessel 201 will be approximately the same at all locations at each instant. It is clear that the total pressure will change cyclically according to changes of the total gas volume within the internal working space, by action of liquid piston 215, and also according to the location of the gas transferred between different temperature zones, by action of the two displacer pistons. To achieve good gas separation in the desired direction by each adsorbent loaded regenerator, the displacer pistons will be coordinated by displacer phase control means so that the reversing flow through the flow path through each regenerator will be maximized in the appropriate direction approximately in phase with maximum selective loading and unloading of the adsorbent responding to pressure variations.

It can be seen that there is a similarity in function and structure between the embodiments of FIGS. 2 and 3. For example, both embodiments utilize a "liquid piston" to couple together vessels containing gas in which volumes and pressures of the gases within the containers fluctuate. For example, if the second variable volume spaces 138 of FIG. 2, and 206, 207 and 208 of FIG. 3 were considered equivalent to each other on a right hand side of the liquid column, the left hand second space 137 in FIG. 2, and the accumulator chamber 220 of FIG. 3 would similarly be equivalent. In this way, it can be seen that both embodiments of the invention balance average pressure of gas on opposite sides of the liquid column.

EXAMPLE 6

Two exothermic reactions are performed sequentially, in which synthesis gas is converted to methanol over a copper-zinc catalyst in the second catalyst bed 251, and the methanol is converted to gasoline range hydrocarbons over ZSM-5 or similar catalyst in the first catalyst bed 250. The reactions in simplified form are $$nCO + 2nH_2 \rightarrow nCH_3OH \rightarrow C_nH_{2n} + nH_2O.$$

The first and second displacers are reciprocated substantially in phase, so that volume changes in chambers 202 and 225 are substantially in phase. Since the first displacer piston has larger swept volume than the second displacer, the swept volume of chmaber 203 is smaller than that of chamber 202, and volume changes in the first and third variable volume spaces will be substantially in phase.

The apparatus may be operated at a mean pressure of about 15 atmospheres. Appropriate temperatures for the two catalytic reactions are approximately 250 degrees Celsius for methanol synthesis over the copper based catalyst, and 350 degrees Celsius for methanol conversion over ZSM-5 zeolite catalyst. The U tube is filled with liquid product, and cooled to approximately ambient temperature.

The apparatus operates in engine mode converting exothermic heat of reaction, so volume changes in the first and third spaces have a leading phase with respect to volume changes in the second space. Feed synthesis gas (carbon monoxide and hydrogen mixture) is fed into the apparatus through valve 262, which may also be used for periodic purge of methane accummulations. Liquid product is withdrawn through valve 261.

EXAMPLE 7

Natural gas is converted to synthesis gas by the endothermic steam reforming reaction, and the synthesis gas is converted exothermically to methanol or hydrocarbon products.

$$CH_4 + H_2O \rightarrow CO + 3H_2 \rightarrow CH_3OH + H_2$$

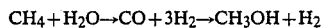

Steam reforming is conducted over alumina supported nickel catalyst in the second catalyst bed 251 at a temperature of about 800 degrees Celsius. Synthesis gas is converted to methanol over copper-zinc catalyst in the first catalyst bed 250 at a temperature of about 250 degrees Celsius, or alternatively may be converted into gasoline range hydrocarbons plus water over a Fischer-Tropsch catalyst at about 300 degrees Celsius. The Fischer-Tropsch catalyst may be based on iron, combined with a ZSM-5 type zeolite for improved selectivity to higher value olefins and aromatics.

In this example, the steam reforming section of the apparatus must operate in a heat pump mode transporting heat to the steam reforming catalyst 251. With regenerator 229 loaded with alumina adsorbent which has suitable high temperature adsorption selectivity and capacity for steam, the more readily adsorbed steam will be trapped over the steam reforming catalyst bed 251, while the less readily adsorbed synthesis gas components will be separated from the third space to the first catalyst bed 250 in the first space. By admitting a slight excess of steam above the stoichiometric requirement of the steam reforming reaction, a high concentration of trapped steam can be achieved in the third space. High steam concentration in steam reformers is highly advantageous in maintaining favourable reaction rates and in inhibiting catalyst deactivation by carbon deposition, but can only be achieved in conventional steam reforming processes by feeding a very large excess of steam.

The section of the apparatus which converts the synthesis gas to methanol or hydrocarbon products must operate in an engine mode, so that the more readily adsorbed products will be separated to the second space where they are condensed. The first regenerator 212 may be loaded with carbon adsorbent if methanol is the product, or with a zeolite adsorbent if hydrocarbons (and water) are to be produced.

Preheated natural gas and steam are admitted to the apparatus through valve 262. Steam reforming catalyst bed 251 is configured to achieve high single pass conversion of the natural gas, to minimize escape of unconverted methane into the second regenerator 229. As the steam reforming reaction produces excess hydrogen as a byproduct to the synthesis gas with a 1:2 ratio of carbon monoxide and hydrogen, this excess hydrogen is delivered as a useful product or fuel from valve 260. Unconverted methane from the steam reforming section and any byproduct methane from the Fischer-Tropsch synthesis will tend to accumulate in the first space (since methane is less readily adsorbed than steam, methanol and higher hydrocarbons), and this methane will be purged with the byproduct hydrogen through valve 260. The liquid methanol or hydrocarbon product will be delivered through valve 261.

In order to achieve the desired separations in the first and second adsorbent-loaded regenerators, it will be clear that when the pressure is relatively decreased, the flow in the first regenerator should be directed from the first space to the second space, and the flow in the second regenerator directed from the first space to the third space, as the flows will then be enriched in their respective more readily adsorbed components. Conversely, when the pressure is relatively elevated, the flows in the first and second regenerators should both be directed toward the first space, as the flows are then enriched in the less readily adsorbed components.

The desired coordination of the flows in the regenerators with the total pressure can be achieved by appropriate phasing of the two displacer pistons and the liquid piston 215. A computer simulation of this apparatus showed that satisfactory operation could be achieved with phase relationships (referring to FIG. 3) such that the upward motion of the first displacer piston 210 has a leading phase of about 50 degrees relative to upward motion of liquid piston 215, while upward motion of the second displacer piston 227 has a lagging phase of about 100 degrees relative to upward motion of the liquid piston 215. The exothermic heat of the synthesis gas conversion reaction in the first space is mostly converted to mechanical work powering the apparatus to perform the pressure swing adsorption separations and also heat pump the balance of the exothermic heat from the first space to the third space. Hence, a fraction of the endothermic heat required for steam reforming can be provided internally as net work of compression, reducing the load on heat exchanger 226 which provides heat for the steam reforming reaction from an external furnace.

EXAMPLE 8

An endothermic dehydrogenation reaction of the form

$$A \rightarrow B + H_2$$

may be performed in the single regenerator embodiment of FIG. 1 operating in the heat pump mode when the reactant "A" is more readily adsorbed than dehydrogenated product "B". However a double regenerator embodiment based on FIG. 3 must be used to perform the two separations necessary when product "B" is more readily adsorbed than reactant "A", which in turn is more readily adsorbed than hydrogen.

Referring to FIG. 3, preheated reactant "A" (here assumed to be less readily adsorbed than dehydrogenated product "B") is introduced through valve 260 into the first space, where the reaction proceeds over the catalyst bed 250. Optional second catalyst bed 251 is deleted in this example. Heat is supplied to the first space by heat exchanger 205. As in Example 6, the displacer pistons are operated substantially in phase, so that volume variations in the first and third spaces have a leading phase relative to volume variations in the second space. Then heat and more readily adsorbed components will be transported across both adsorbent loaded regenerators, from the third space to the first space, and from the first space to the second space. Conversely, the less readily adsorbed components will be separated in the reverse direction.

In the first adsorbent loaded regenerator 212, the more readily adsorbed product "B" will separated to the first space where it may condense, while relatively less readily adsorbed reactant "A" is returned to the catalyst bed 250. In the second adsorbent loaded regenerator 229, the less readily adsorbed hydrogen product is separated to the third space 225, while the relatively more readily adsorbed reactant "A" is again returned to catalyst bed 250. Hence, the reactant "A" is trapped in the first space until the reaction is carried to completion, while hydrogen can be withdrawn from valve 262 and product "B" can be withdrawn from valve 261.

While the first space must be maintained at the reaction temperature, the temperatures of the second and third spaces will be selected accroding to the convenient temperatures of delivering product "B" and the hydrogen, also considering the process energy heat balance and available heat sources. Neglecting heat conduction losses, the endothermic heat demanded by the reaction will be supplied as the heat provided by heat exchanger 205 minus net heat of expansion removed by the compound thermodynamic cycle from the first space. If the first displacer has larger swept volume than the second displacer, more heat will be transported from the first space through the firt regenerator 212 than is carried to the first space through the second regenerator 229 operating across the same temperature difference, so the overall apparatus operates in an engine mode drawing heat from heat exchanger 205. If the second displacer has larger swept volume, more heat would be transported through the seond regenerator than the first regenerator, so part of the heat of reaction would be supplied as net heat of compression in the first space, and the overall apparatus would be working in a heat pump mode.

A more specific example is decomposition of hydrogen sulfide, which can be performed over known catalysts such as molybdenum disulfide at temperatures of 500 to 800 degrees Celsius. Here, hydrogen sulfide is reactant "A" and elemental sulfur is product "B". Since the boiling point of sulfur is 444.6 degrees Celsius at one atmosphere, sulfur will be more readily adsorbed over common adsorbents than hydrogen sulfide at elevated temperatures. The first space may be maintained at about 600 degrees Celsius, the second space at about 450 degrees (depending on whether sulfur is to be removed as liquid or vapour), and the third space at ambient or other sufficiently low temperature to ensure good selectivity between hydrogen and hydrogen sulfide over a convenient adsorbent such as zeolite 13X.

It will be evident from the embodiments and examples described above, that the invention provides a fundamental advance in chemical reaction engineering, which can be applied with great flexibility in diverse embodiments and combinations to many other specific processes within the scope of the following claims.

I claim:

1. A process for conducting a chemical reaction between reacting species of gases, the process including the steps of:
   (a) providing a reactant for the reaction which produces a product of the reaction, the reactant and the product being gas phase components which have different selectivities of adsorption on an adsorbent material, such that one of the components is a more readily adsorbed component and the other is a less readily adsorbed component,
   (b) providing a flow path connecting first and second variable volume spaces within an internal working volume,
   (c) introducing a feed gas which includes the reactant into a reaction space constituting a part of the internal working volume,
   (d) conducting the reaction within the reaction space to form a gas mixture which includes the reactant and the product of the reaction,
   (e) permitting the gas mixture from the reaction to contact the adsorbent material disposed along the flow path connecting first and second variable volume spaces,
   (f) cyclically varying volumes of the first and second variable volume spaces at equal periodic frequencies and with a different phase relative to each other to impose flow of the gas mixture in the flow path with cyclic reversals of flow direction,
   (g) maintaining the temperature of the first variable volume space approximately at a first temperature, and the temperature of the second variable volume space approximately at a second temperature,
   (h) cyclically exchanging heat between the gas mixture in the flow path and a material with heat capacity disposed along the flow path,
   (i) cyclically varying total pressure of the gas mixture in the flow path, at the same periodic frequency as said cyclic volume variations and with a phase coordinated with the variations of the first and second variable volume spaces, such that the more readily adsorbed component is preferentially adsorbed on the adsorbent material under increased pressure when the gas mixture is flowing along the flow path in one direction, and is desorbed and free to move with the gas flow when the pressure is decreased and the flow direction in the flow path is reversed, thus separating the gas mixture within the internal working volume by pressure swing adsorption so the reactant is relatively concentrated toward the first variable volume space, while the product is removed from the first variable volume space and relatively concentrated in the second variable volume space,
   (j) withdrawing a concentrated product from the internal working volume,
   (k) converting and transporting thermal energy within the internal working volume according to a regenerative thermodynamic cycle associated with the said cyclic variations of pressure and the said cyclic variations of the volumes of the first and second variable volume spaces.

2. The process of claim 1 further including:
   (a) associating the reaction space with the first variable volume space,
   (b) enhancing conversion of the reactant to the product by concentrating the reactant toward the reaction space and removing the product from the reaction space.

3. The process of claim 2, further including:
   (a) inhibiting a reversible side reaction between reacting species to produce a by-product, in which the byproduct and the product have different selectivities of adsorption on the adsorbent material, while the byproduct and the reactant have relatively similar selectivities of adsorption on the adsorbent material, p1 (b) concentrating the by-product with the reactant in the reaction space,
   (c) withdrawings concentrated product from the internal working volume so as to inhibit the side reaction to improve selectivity of the reaction toward the product.

4. The process of claim 1, in which the reaction is exothermic, the product is a more readily adsorbed component, and the reactant is a less readily adsorbed component, the process being further characterized by:
   (a) coordinating the phase of the cyclic variations in the total pressure within the flow path and the cyclic variations of the first and second variable volume spaces,
   (b) preferentially adsorbing the product on the adsorbent material under increased pressure when the gas mixture is flowing along the flow path in the direction toward the first variable volume space,
   (c) desorbing the product when the pressure is decreased and the flow direction in the flow path is reversed toward the second variable volume space,
   (d) concentrating the reactant toward the first variable volume space and concentrating the product toward the second variable volume space,
   (e) by means of the regenerative thermodynamic cycle, taking up net heat of expansion at substantially the first temperature in the first variable volume space, and delivering net heat of compression at substantially the second temperature in the second variable volume space.

5. The process of claim 4 further characterized by:
   (a) cyclically varying the total pressure in the flow path by the cyclic variations of the first and second variable volume spaces, such that the cyclic variations of the first variable volume space have a leading phase relative to the cyclic variations of the second variable volume space, thus coordinating the relative phase between the cyclic variations of total pressure and of the flow in the flow path.

6. The process of claim 4 further characterized by:

(a) conducting the reaction in the first variable volume space so that the reaction is conducted at approximately the first temperature, (b) concentrating the product toward the second variable volume space.

7. The process of claim 6 further characterized by:

(a) maintaining the first temperature higher than the second temperature, (b) converting a portion of the exothermic heat of reaction by the regenerative thermodynamic cycle to mechanical power which in part overcomes fluid flow friction and other energy dissipation losses associated with operation of the process.

8. The process of claim 4 further characterized by, (a) inhibiting a side reaction which tends to produce a byproduct which is a less readily adsorbed component, (b) substantially trapping the byproduct in the reaction space, (c) maintaining the relatively high partial pressure of the byproduct in the reaction space.

9. The process of claim 1, in which the reaction is endothermic, and the reactant is a more readily adsorbed component while the product is a less readily adsorbed component, the process being further characterized by:

(a) coordinating the phase of the cyclic variations in the total pressure within the flow path and the cyclic the variations of the first and second variable volume spaces, (b) preferentially adsorbing the reactant on the adsorbent material under increased pressure when the gas mixture is flowing along the flow path in the direction toward the second variable volume space, (c) desorbing the reactant when the pressure is decreased and the flow direction in the flow path is reversed toward the first variable volume space, (d) concentrating the reactant toward the first variable volume space and concentrating the product toward the second variable volume space, (e) by means of the regenerative thermodynamic cycle, taking up net heat of expansion at substantially the second temperature in the second variable volume space, and delivering net heat of compression at substantially the first temperature in the first variable volume space.

10. The process of claim 9 further characterized by:

(a) cyclically varying the total pressure in the flow path by the cyclic variations of the first and second variable volume spaces, such that the cyclic variations of the second variable volume space have a leading phase relative to the cyclic variations of the first variable volume space, thus coordinating the relative phase between the cyclic variations of total pressure and of the flow in the flow path.

11. The process of claim 9 further characterized by:

(a) conducting the reaction in the first variable volume space so that the reaction is conducted at approximately the first temperature, (b) concentrating the product toward the second variable volume space.

12. The process of claim 11 further characterized by:

(a) maintaining the first temperature higher than the second temperature, (b) converting a portion of the endothermic heat of reaction as net heat of compression delivered to the first variable volume space by the regenerative thermodynamic cycle acting as a heat pump cycle.

13. The process of claim 9 further characterized by:

(a) inhibiting a side reaction which tends to produce a byproduct which is a more readily adsorbed component, (b) trapping the byproduct in the reaction space, (c) maintaining the relatively high partial pressure of the byproduct in the reaction space.

14. The process of claim 9 further characterized by:

(a) performing, an endothermic dissociation reaction at high temperature in the first variable volume space, (b) quenching the reaction by rapid cooling of the dissociation products in the portion of the regenerator adjacent to the first space when the flow in the flow path is directed out of the first space.

15. The process of claim 7 further characterized by:

(a) admitting into the reaction space hydrogen as one reactant, and carbon monoxide as the other reactant, (b) providing a methanol synthesis catalyst in the reaction space, (c) conducting as exothermic reaction in the reaction space to produce methanol.

16. The process of claim 7 further characterized by:

(a) admitting into the reaction space methane as one reactant, and oxygen as another reactant, (b) conducting as exothermic reaction in the reaction space to produce methanol.

17. The process of claim 15 further characterized by:

(a) selecting the adsorbent material from the group consisting of charcoal, carbon molecular sieve and ZSM-5.

18. The process of claim 12 further characterized by:

(a) introducing into the reaction space methanol as a first reactant, and steam as another reactant, (b) performing in the reaction space a steam reforming reaction over a catalyst to produce hydrogen as a product.

19. A process for conducting a chemical reaction between reacting species which enter and leave the reaction in a mobile and compressible fluid phase, the process including the steps of:

(a) providing the reacting species which include a first component which is preferentially transformed under increase of pressure to a less mobile phase, and a second component which substantially remains in the mobile fluid phase under the same increase of pressure, (b) providing a flow path which connects first and second variable volume spaces, (c) conducting the reaction within a reaction space to form a mobile and compressible fluid mixture of the reacting species including the first and second components, (d) introducing the fluid mixture into the flow path connecting first and second variable volume spaces, (e) cyclically varying volumes of the first and second variable volume spaces at equal periodic frequencies and with a different phase relative to each other to impose flow of the fluid mixture in the flow path with cyclic reversals of flow direction, (f) maintaining the temperature of the first variable volume space approximately at a first temperature, and the temperature of the second variable volume space approximately at a second temperature, (g) cyclically exchanging heat between the fluid mixture in the flow path and a material with heat capacity disposed along the flow path, (h) cyclically varying total pressure of the fluid mixture in the flow path, at the same periodic frequency as said cyclic volume variations and with a phase coordinated with the cyclic reversals of flow direction in the flow path such that the first component is preferentially transformed to its relatively less mobile phase by increased pressure when the fluid mixture is flowing along the flow path in the direction toward the first variable volume space, and is transformed back to its mobile phase in the fluid mixture by decreased pressure when the fluid mixture is flowing along the flow path in the reverse direction toward the second variable volume space, (i) separating the fluid mixture by relatively concentrating the first component toward the second variable volume space and relatively concentrating the second component toward the first variable volume space, so that the desired productivity of the reaction is enhanced, (j) converting and transporting thermal energy according to a regenerative thermodynamic cycle by using the fluid mixture as working fluid and coupled to external mechanical energy through the cyclic variations of pressure and of the volumes associated with variable volume spaces, such that over each cycle net heat of expansion is taken up by the fluid in the first variable volume space, and net heat of compression is delivered by the fluid in the second variable volume space.

20. The process of claim 19 further characterized by:
(a) preferentially transforming, the first component under increase of pressure to a less mobile phase by adsorption over an adsorbent material disposed along a portion of the flowpath.

21. The process of claim 19 further characterized by:
(a) preferentially transforming the first component under increase of pressure to a less mobile phase by absorption in a liquid absorbent retained in a portion of the flow path.

22. The process of claim 21 further characterized by:
(a) providing the liquid absorbent in a porous material disposed along the flow path.

23. The process of claim 21 further characterized by:
(a) preferentially transforming the first component under increase of pressure to a less mobile phase by condensation in a portion of the flow path.

24. An apparatus for conducting a chemical reaction between reacting species of gases having a pair of gas phase components which include a reactant and a product which have different selectivities of adsorption on an adsorbent material, such that one of the reactant and product pair is a more readily adsorbed component and the other is a less readily adsorbed component, the apparatus comprising:
(a) a first volume displacement means cooperating with a first variable volume space and means to change volume of the first space cyclically at a periodic frequency,
(b) a second volume displacement means cooperating with a second variable volume space and means to change volume of the second space cyclically at the same periodic frequency as the first volume displacement means,
(c) means to maintain the first variable volume space approximately at a first temperature, and means to maintain the second variable volume space approximately at a second temperature,
(d) an adsorbent loaded regenerator connected at one end thereof to the first variable volume space and at a second end thereof to the second variable volume space, so that the regenerator provides a flow path between the first and second spaces, the adsorbent material and a material with heat capacity being associated with the flow path,
(e) a reaction space in which the reaction is conducted, the reaction space communicating with the adsorbent loaded regenerator,
(f) means to introduce a feed gas including the reactant into the reaction space,
(g) means to convey a gas mixture including the reactant and the product from the reaction space to the flow path through the adsorbent loaded regenerator,
(h) means to coordinate relative phase of displacement of the first and second volume displacement means, in order to impose cyclic variations of total pressure within the apparatus, and also to impose cyclically reversing flow of the gas mixture in the flow path through the adsorbent loaded regenerator, so that preferential adsorption and desorption of the more readily adsorbed component in response to pressure variations is substantially in phase with the reversing flow of the gas mixture in the flow path, in order to achieve enrichment of the gas mixture in the reactant when the flow in directed toward the first variable volume space, and to achieve enrichment of the gas mixture in the product when the flow is directed toward the second variable volume space,
(i) means to withdraw a concentrated product from the apparatus.

25. The apparatus of claim 24, in which the reaction space is located within or adjacent to the first variable volume space.

26. The apparatus of claim 25, with means to stimulate the reaction provided in the reaction space.

27. The apparatus of claim 26, in which the means to stimulate the reaction is a heterogeneous catalyst.

28. The apparatus of claim 25, in which the product is a more readily adsorbed component while the reactant is a less readily adsorbed component, the apparatus being further characterized by:
(a) means for conducting an exothermic reaction in the reaction space,
(b) means to coordinate displacement of the first and second variable displacement means so that volume variations of the first variable volume space have leading phase with respect to volume variations of the second variable volume space.

29. The apparatus of claim 25, in which the reactant is a more readily adsorbed component while the product is a less readily adsorbed component, the apparatus being further characterized by:
(a) means for conducting an endothermic reaction in the reaction space,
(b) means to coordinate displacement of the first and second variable displacement means so that volume variations of the second variable volume space have leading phase with respect to volume variations of the first variable volume space.

30. The process of claim 1 further characterized by:

(a) admitting into the reaction space, oxygen as a reactant to produce ozone as the product, oxygen being a less readily adsorbed component relative to ozone, (b) coordinating relative displacements of the first and second variable displacement means so that volume variations of the first variable volume space have a leading phase with respect to volume variations of the second variable volume space, (c) stimulating the reaction with an electrical discharge, (d) producing ozone as a product which is a more readily adsorbed component when compared with oxygen as the reactant.

* * * * *